United States Patent [19]
Vatne et al.

[11] Patent Number: 5,357,892
[45] Date of Patent: Oct. 25, 1994

[54] DEFLECTOR

[75] Inventors: Odd O. Vatne, Oslo; Hans Cappelen, Blommenholm; Øyvind Sørbotten, Haugesund; Tor Elholm, Hosle; Gunnar Lindemann, Oslo, all of Norway

[73] Assignee: Geco A.S., Stavanger, Norway

[21] Appl. No.: 35,365

[22] Filed: Mar. 22, 1993

[30] Foreign Application Priority Data

Mar. 24, 1992 [NO] Norway ................... 921155
Mar. 12, 1993 [NO] Norway ................... 930904

[51] Int. Cl.⁵ .................................... B63B 21/66
[52] U.S. Cl. ................................ 114/244; 114/253; 114/245
[58] Field of Search ...................... 114/242–246, 114/253; 244/153 R, 153 A, 154; 43/43.13, 9.7

[56] References Cited

U.S. PATENT DOCUMENTS

| 2,062,718 | 12/1936 | Kallburg | 43/43.13 |
| 4,033,278 | 7/1977 | Waters | 114/245 |
| 4,484,534 | 11/1984 | Thillaye du Boullay | 114/244 |

FOREIGN PATENT DOCUMENTS

| 0242483 | 10/1987 | European Pat. Off. |
| 1002718 | 3/1952 | France. |
| 2477373 | 9/1981 | France. |
| 158089 | 4/1988 | Norway. |
| 216721 | 4/1925 | United Kingdom. |
| 2115661 | 9/1983 | United Kingdom. |
| 2122562 | 1/1984 | United Kingdom. |
| 2193476 | 2/1988 | United Kingdom. |

Primary Examiner—Edwin L. Swinehart
Attorney, Agent, or Firm—Jacobson, Price, Holman & Stern

[57] ABSTRACT

A deflector (2) for installation in the tow-line (4, 5) between a towing vessel and a tow which is located in the water, e.g. a cable with seismic sources or a seismic source array, is suspended by a float (1) and has a fitting (9) therefrom having a tow-point (7) near the front part of the deflector connected to the tow-line (4), and an attachment point (8) to the rear of the deflector for further connection thereto of the rear part of the tow-line connected to the two. In order to be able to locate the deflector in a desired position in relation to the towing vessel and compensate for alternations in the effects of forces from the tow or vessel in addition to movements in the water, the tow-line (5) which leads on to the actual tow from the deflector body (2) is attached (8) to the deflector via a pivotable lever (10) which is situated at the same height as the lifting force center of the deflector body. The tow-point (7) for the tow-line (4) is provided at one lateral surface of the deflector body (2) in front of the vertical center line thereof. An additional deflector wing (18) may be incorporated in the rear part (5) of the tow-line.

19 Claims, 5 Drawing Sheets

FIG. 7b
FIG. 7a
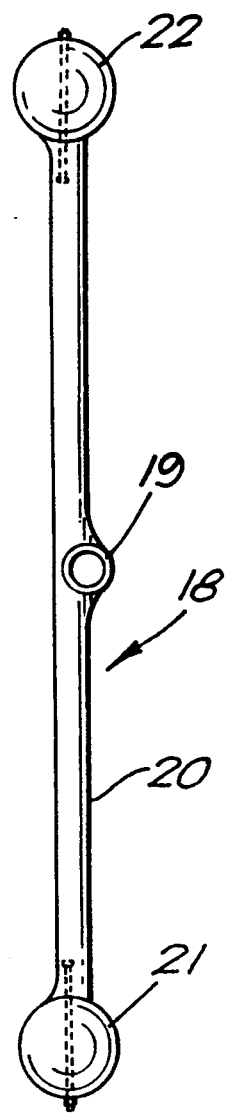
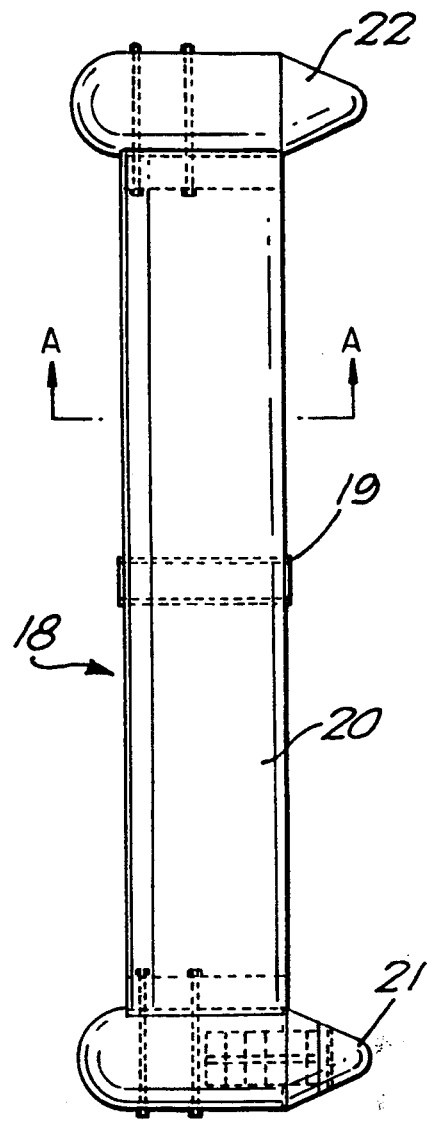
FIG. 7c
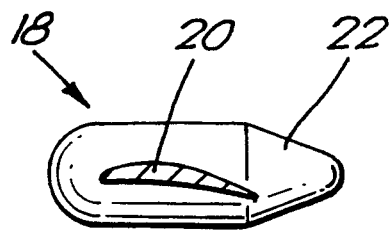

DEFLECTOR

BACKGROUND OF THE INVENTION

The invention concerns a deflector to be installed in the tow-line between a towing vessel and a tow located in the water, e.g. a streamer, a cable with seismic sources or a seismic source array. The deflector is suspended on a float and is located between a tow point on the tow-line and an attachment point for further connection to the tow.

When an object or different types of equipment have to be towed through the water behind a vessel with the purpose of, e.g., performing special measurements, it is often important that the tow should not follow directly behind the towing vessel but should be pulled out to the side in order to follow a specific path. This is particularly vital in the case of seismic surveys, and at present this work is generally carried out with a number of tow-lines or chains of equipment which are towed in parallel paths behind a vessel. This may entail both individual groups of seismic energy sources for transmission of seismic pulses to the seabed, or rows of such groups of energy sources, or it may involve seismic streamers which are designed to record seismic reflection signals. In order to keep such tows apart from one another and at defined distances from the side of the towing vessel, a number of different devices have been developed. Float devices with rudders have been proposed which are attached to the tow-line at a suitable distance from the vessel, and a variety of otter board devices have also been used.

However, a common drawback for all of these designs has been some degree of sensitivity to sea motion, which has resulted in an erratic passage for the towed measuring equipment. This involves both the effects of wave movements on the otter board or float as well as various drift phenomena. For this reason continuous readjustments have been necessary, which have been difficult to perform, with the result that interruptions in the recording process have often had to be accepted and the tow path has not been exactly as planned.

There has therefore been an urgent need for a device of this kind, which can pull a tow out to a desired position or path behind a towing vessel and where this deflector is so designed as to "counteract" influences from its environment while at the same time adhering to a predetermined path.

BRIEF SUMMARY OF THE INVENTION

Thus, it is an object of the invention to provide a deflector which is so designed that it compensates for wave movements and other disturbances in the water, thereby giving the following cable or the following equipment as smooth and steady a passage as possible. It is also desirable for such a deflector device to be equipped with a control device enabling adjustments to be made in its path, and that the deflector can be positioned or moved as required, especially by remote control from the towing vessel.

The invention is based on a wing-shaped deflector body, in principle positioned vertically in the water and wherein the connecting elements to the lines which lead to the towing vessel and to the following tow are located in a unique manner. The deflector is completely submerged in the water in use and is suspended under a float. The following tow which is controlled by the deflector is suspended at the rear of the deflector wing and is responsible for stabilization. The deflector's rear section is directly connected to the tow's cable and uses the cable forces to maintain its equilibrium. Thus, no hydrodynamic rudder arrangements are necessary. The position of the rear section will determine the angle at which the lifting force acts. It is advantageous to locate the tow-point, i.e. the connection for the line which leads to the towing vessel, lower than the deflector's center of lift, i.e. the point at which the lateral force acts. This will give some degree of tilting or rolling motion ensuring that the deflector always is seeking down and will not come to the surface. The tilting is counteracted by the forces which act on the respective connecting points, especially the connection up to the float. Due to the position of the tow-point, an eccentric force will influence the upper part of the deflector which will cause it to roll or turn outwards. The float is connected with the top of the body and forms a large lever arm for rolling stability. If the float line becomes slack, e.g. due to wave effects, the deflector will roll outwards and be forced into the water until the line is tight again. Furthermore the tow-point is positioned in front of the center line of the deflector, i.e. in front of the deflector's center of lift. This again causes some degree of asymmetrical cooperation between the acting forces, which will give a stabilizing and dampening effect on forces acting in the direction of flow.

The tow-point is located in front of the point for the lifting force. If an increase in local water speed occurs (large wave), the deflector's lifting force will increase. Since the cable's towing force is constant, a new state of equilibrium with a smaller angle will be established. This smaller angle will reduce the lifting force. Thus the deflector is self-dampening in extreme conditions.

In order to bring the following tow out of the disturbed water (downwash and vortex wake) generated by the deflector, a so called "mini-wing" may be incorporated in the tow line behind the deflector.

The deflector's "self-regulating" method of operation can also be illustrated in the following way:

In order to set different angles or adjust the effect of the deflector, i.e. how far out it should go across the towing vessel's direction of travel, it can be advantageous to install in the deflector body a control element which can affect the deflector's angle lever to which the tow is connected. It will, of course, be possible to control this adjusting mechanism manually by setting it before the deflector is deployed in the water, but it can also be controlled by means of a remote-control mechanism, which is equipped with an appropriate operating device.

The positioning of a further, smaller deflector wing in the tow-line behind the deflector will further assist in stabilizing the tow-line so that an accurate adjustment of the deflector angle will be possible.

BRIEF DESCRIPTION OF THE DRAWINGS

In the following section the invention will be described in more detail by means of an embodiment, which is illustrated purely schematically in the accompanying drawings wherein:

FIG. 7a is a top plan view of the wing deflector in accordance with the invention;

FIG. 7b is a left side view of FIG. 7a; and

FIG. 7c is a cross-sectional view taken along line A—A of FIG. 7a.

DETAILED DESCRIPTION

Figure 1:
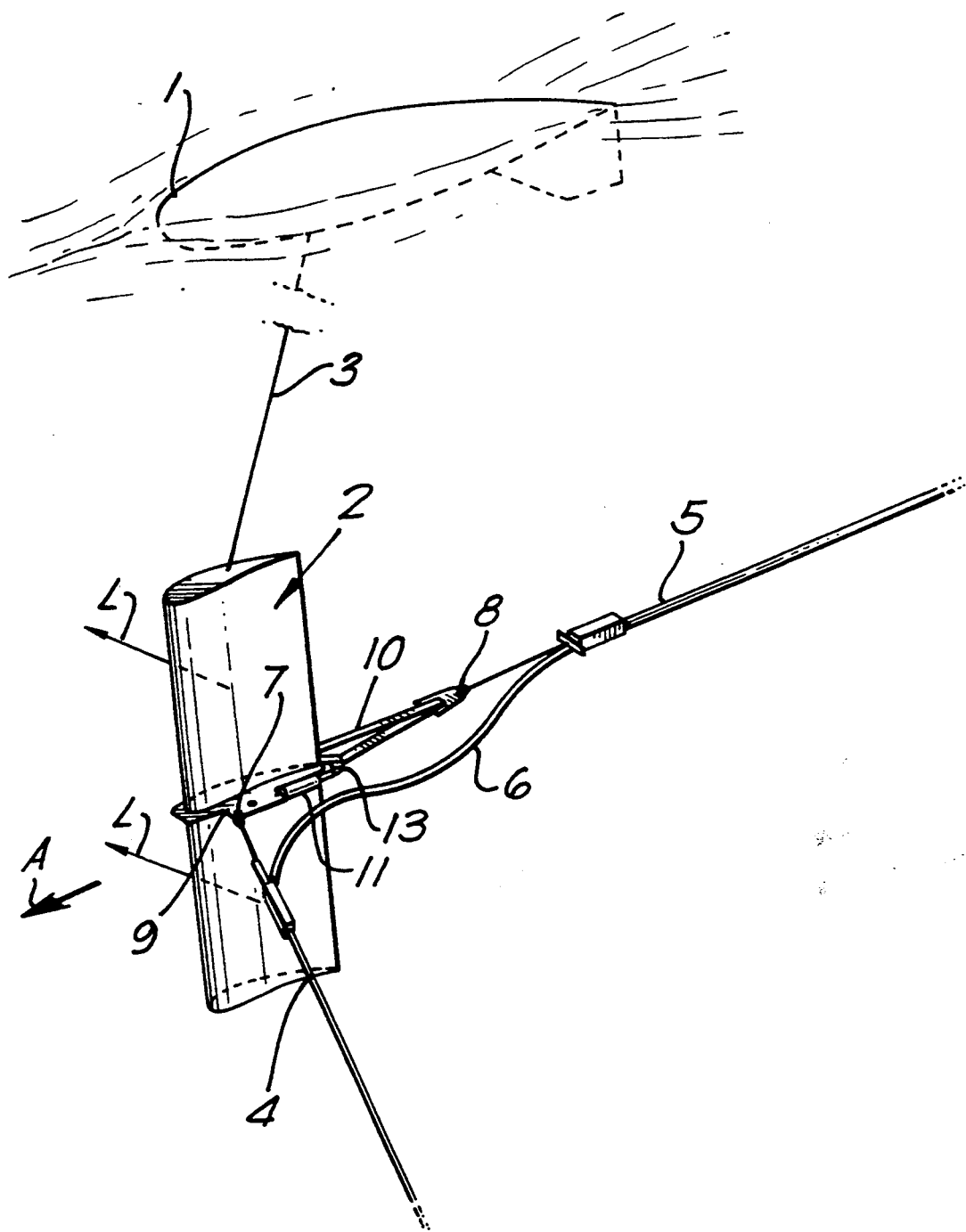
FIG. 1 is a perspective view illustrating a deflector in accordance with the invention with its connecting points.
Figure 2:
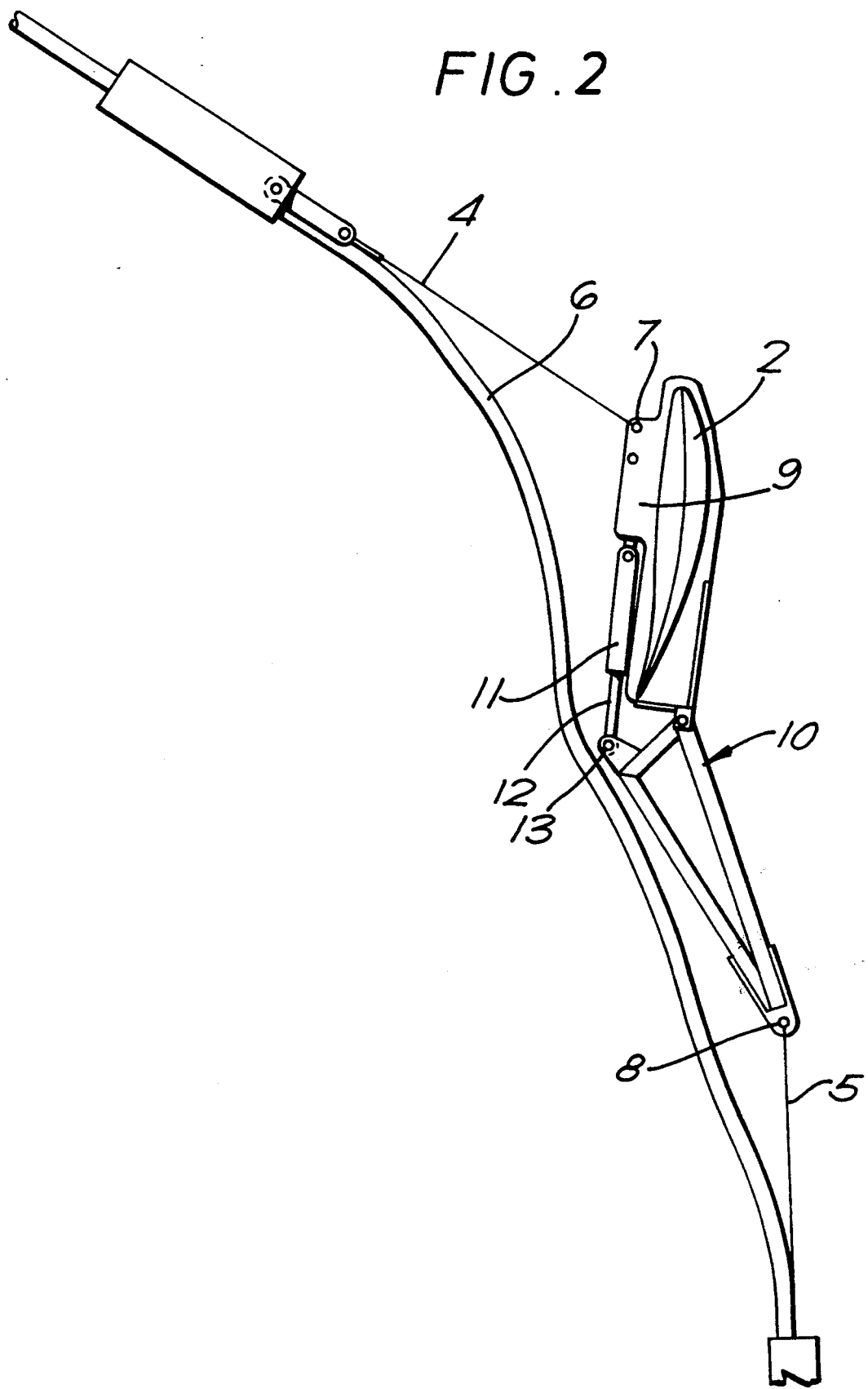
FIG. 2 is a top plan view of the deflector of FIG. 1.

FIGS. 1 and 2 illustrate the construction of the deflector according to the invention. From a float 1 on the surface of the water there is attached at a desired distance, which is based on the depth at which the tow will be located, a deflector body 2 by means of a line 3. The line 3 is suspended above the deflector body 2, which has a winged or streamlined shape as illustrated in the figures. The deflector body which acts as a kind of otter board is installed in the line which goes from the towing vessel to the tow, i.e. the equipment which is towed behind the vessel through the water. The part of the line which leads from the vessel to the deflector is described as tow-line 4, while the cable or line which leads on from the deflector to the equipment being towed is indicated by 5. The two respective attachment points to the deflector are indicated by 7 and 8. A cable which performs the necessary communication with the tow is led along the tow-line 4 and the line 5 and is indicated by 6. It is removed from the tow-line 4 in the area of the deflector and reconnected with the line 5 some distance after the connecting point 8. This cable section 6 is slack, in order to prevent it from influencing the deflector's movements.

Figure 5:
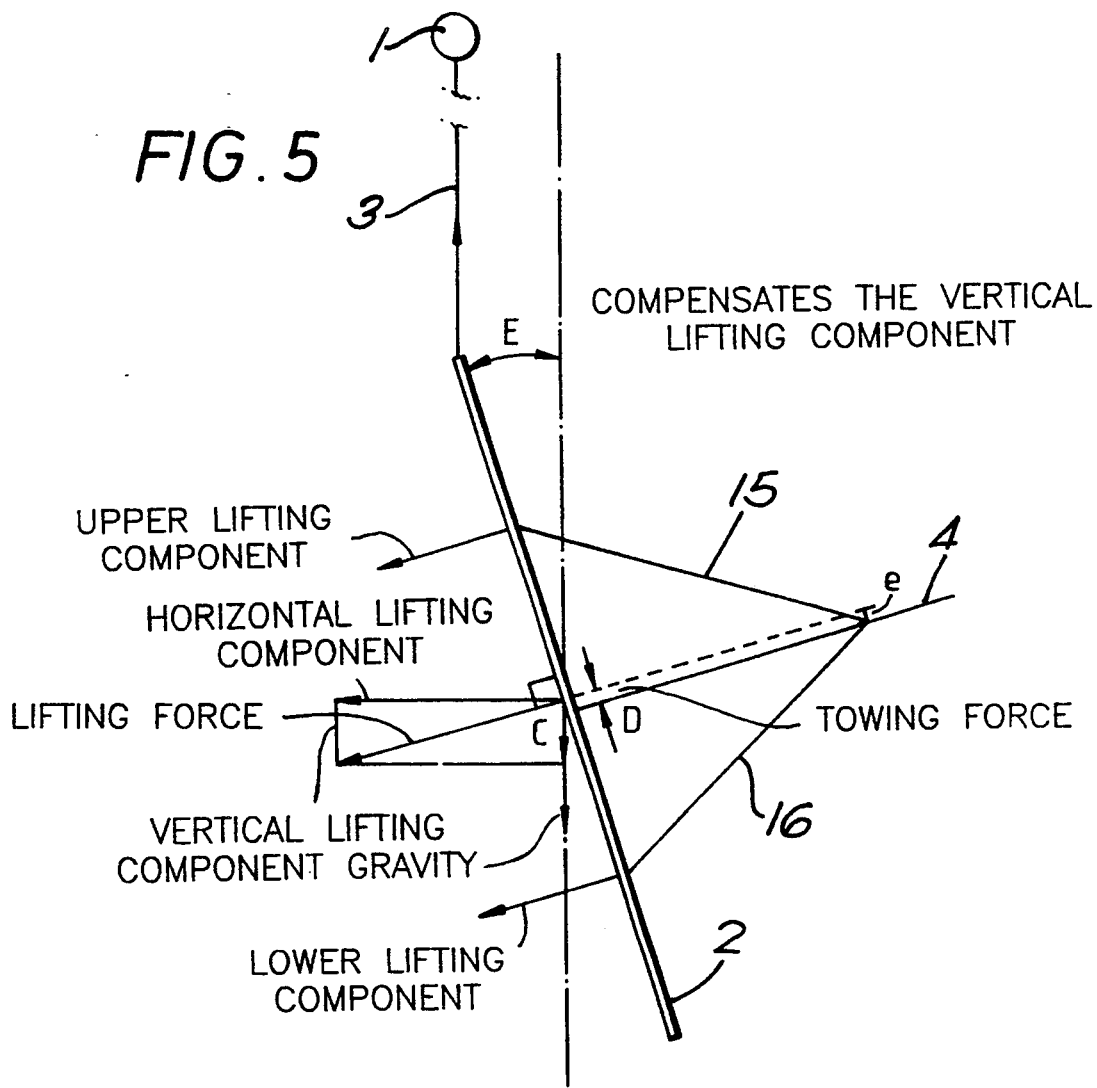

The deflector is equipped with a fitting 9 to the deflector's vertical axis. In the embodiment in FIG. 1, the fitting is located somewhat lower or deeper in the water than the position of the deflector's center of lift. The center of lift and the distribution of the lifting forces are illustrated in FIG. 5. The fitting 9 in FIG. 1 has on the side facing the tow-line 4 a flange section with holes for attaching a tow-line, preferably several holes for adjustment purposes. The, attachment point is indicated by 7.

At its rear end the fitting is equipped with an angle lever, which is indicated by 10 and which is rotatable or pivotable about a point on the fitting, on the opposite side to the side which faces the tow-line 4. The attachment point 8 is located at the end of this lever. The angle lever 10 is connected by its second leg via a pivotable connection 13 with the side of the fitting 9 which is provided with a flange. For adjusting purposes there can be provided here, as is best illustrated by FIG. 2, an adjustable piston cylinder mechanism 11, 12, which can cause a forward and backward movement of the angle lever's 10 pivotable connection 13. This adjusting mechanism can also be of a different shape to that of a piston cylinder, and the device can be capable of being operated by a motor drive, e.g. a hydraulic motor in the deflector, a battery-driven motor or it could be adjusted before being deployed.

The attachment point 7 is located in front of the center of lift of the deflector wing 2.

During towing in the direction of arrow A, the line 5 which leads to the tow which is controlled by the deflector will perform some degree of stabilization of the deflector. In the embodiment illustrated in FIG. 1, the tow-point 7, i.e. the connection to the towing vessel, is located lower than the deflector's center of lift, which gives some tilting-rolling motion which is counteracted by the force from the float and results in a tilting of the wing. Since the tow-point 7 is located in front of the center of lift of the deflector 2, an asymmetrical cooperation will occur with the line 5 which leads to the tow. When correctly adjusted, this cooperation of forces will create a stabilizing or dampening effect on forces acting in the direction of flow. As illustrated in the drawing, the tow-point 7 and the connecting point 8 are located on the same horizontal plane. In order to achieve the best possible stabilizing and self-adjusting effect for the deflector, the tow-point is preferably provided at a distance which lies between 1 and 3% of the deflector's height under the deflector body's center of lift and in an area between 0 and $\frac{1}{3}$ of the deflector wing's 2 chord length from the deflector wing's 2 front edge.

Figure 3:
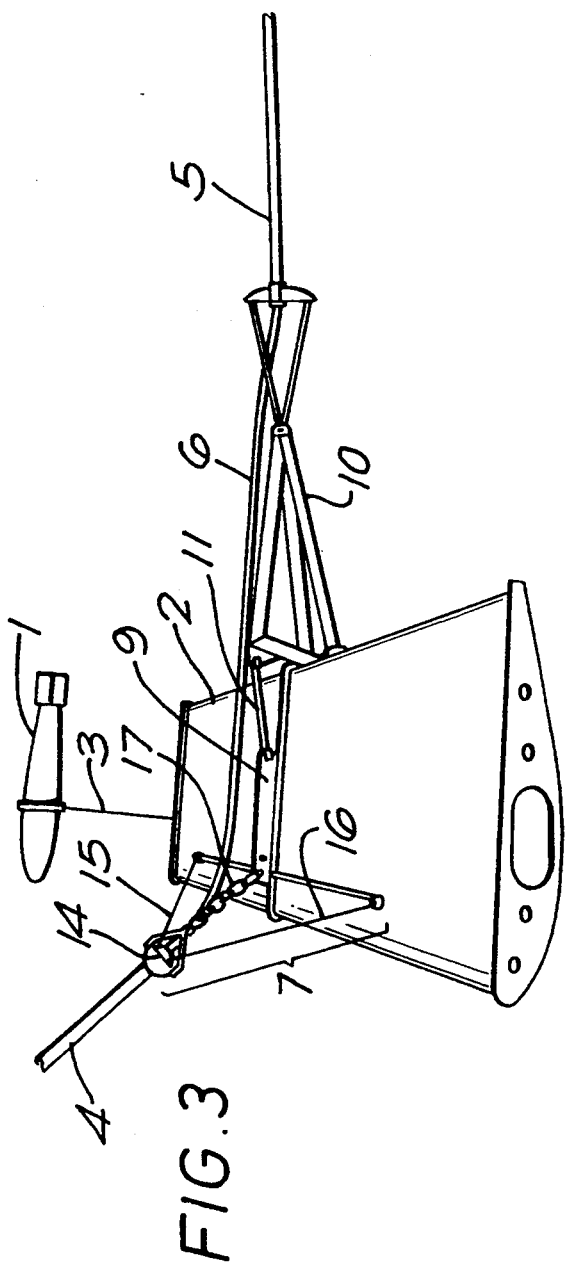
FIG. 3 is a perspective view of an alternative embodiment of the deflector of the invention.
Figure 4:
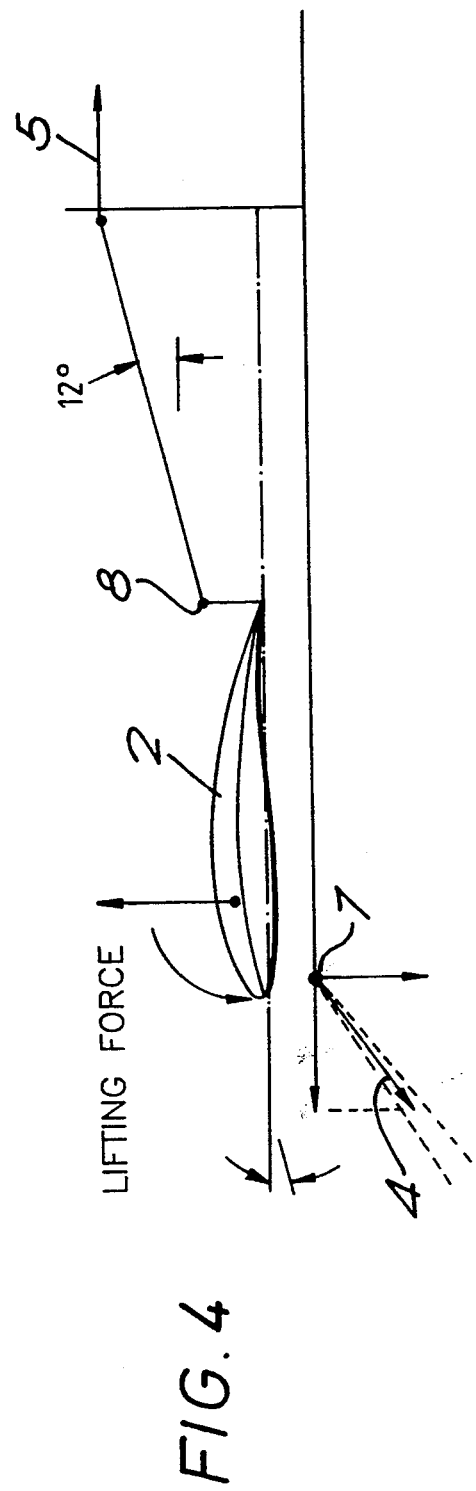
FIGS. 4 and 5 are two schematic views illustrating the forces acting on the deflector, viewed from above and from the side, respectively.

FIG. 3 illustrates a specially preferred embodiment of the invention. In practice, experiments have demonstrated that the attaching of the tow-line to the deflector body, i.e. the positioning of this tow-point is extremely critical. Small displacements can easily lead to erratic movements of the wing, which are not critical per se, but it will be advantageous to avoid such vibrations. For this purpose a design of the tow-point has been developed as illustrated in FIG. 3. The tow-line is split at point 14 into a crow's foot whose two parts 15 and 16 are attached to respective points situated one above the other on the upper and lower halves of the deflector body. It is advantageous to place these points on a level corresponding to the center of lift of the respective half or the point at which the lifting force component acts. For the real transmission, of forces, a direct connection can be kept if so desired onto the fitting 9, e.g. with a chain 17, but this is not absolutely necessary. The two parts of the crow's foot 15, 16 can be of different lengths, thus allowing the position of the tow-points to be adjusted by adjusting the length of the parts 15, 16, and thus enabling the real tow-point to be positioned lower than the center of lift. In this case the fitting 9 and the lever 10 can be located in the middle of the deflector. FIG. 4 illustrates the balance of the forces at the side of the deflector body for the tow-line from the vessel 4 and for the line to the tow 5. An increase in the lifting force of the deflector body or the wing 2 will result in a turning as illustrated by the curved arrow. This will reduce the angle of attack of the wing 2 and produce a reduction in the lifting force which again gives a turning in the opposite direction. This demonstrates that the deflector is self-damping in the event of a local increase in the lifting force as a result of wave effects.

FIG. 5 illustrates the distribution of forces on a deflector according to the invention in its operating position. The deflector is here illustrated lying at an angle as it will do during towing. The deflector is depicted here merely as a line which is indicted by 2. A crow's foot arrangement has been used here with parts 15 and 16 to the tow-line 4. The force from the float acts in the direction of the line 3. The actual deflector body is divided into an upper part and a lower part, and during towing through the water the deflector wing will be influenced by the hydrodynamic forces and provide a vertical lifting force which acts on a center point C (center of lift) for the total force. This lifting force can be divided into an upper lifting force which acts on the upper part of the deflector wing and a lower lifting force which acts on the lower part of the wing. Both of these forces are indicated as arrows pointing towards the left of the figure, while the total lifting force is indicated as an arrow from point C. These forces are perpendicular to the deflector body's length. The towing force acts as a force in the opposite direction and its point of attack is indicated by D. The location of the point will be dependent on the length of the crow's foot parts 15, 16. In the illustrated example the part 15 is longer than the part 16, thus causing point D to be below point C. The lifting force can be divided into a vertical component and a horizontal component as illustrated in the drawing. The vertical component together with the force of gravity will be compensated for by the vertical force from the float 1. The horizontal force components between towing force and lifting force will balance each other, thus maintaining the position at the desired angle as indicated by E. The forces will be balanced in this position and give a stable passage for the deflector through the water. It should be noted that there is an eccentric positioning of the centers of force influence. It will also be possible to achieve a similar effect, however, by the use of other configurations, in which the lifting force and the towing force act on the same point, but in which the force of gravity component, e.g., is made to affect the balance in another way, thus achieving the same result. All such modifications are intended to fall within the scope of the invention.

For the purpose of setting different angles or effects of the deflector, i.e. how far out it should go, it can be advantageous to install a control element in the deflector, as described above, consisting, e.g., of a piston 12 which is inserted in a cylinder 11 and which affects pivotable connection point 13 on the angle lever. When point 13 is pushed out in the extension of the angle lever, i.e. when the position of the angle lever 10 is altered, this will bring about an alteration of the force effect on the deflector, thus forcing it to change its position and thereby result in a different position in relation to the towing direction A, thus pulling the tow further out to the side or further in. As already mentioned, the adjusting mechanism will naturally be capable of being controlled both manually by setting it before the deflector is deployed in the water or it can be controlled mechanically in some way after deployment. The device can also be remotely controlled if a driving motor for the mechanism is incorporated in the deflector wing. The turning mechanism 11, 12 can be given a large turning angle, up to 60° adjustment of pivotable connection 13 about the pivotable connection of angle lever 10 to fitting 9. The driving element for the turning mechanism can, e.g., also be battery driven, and can be controlled via electrical pulses for remote control.

Figure 6:
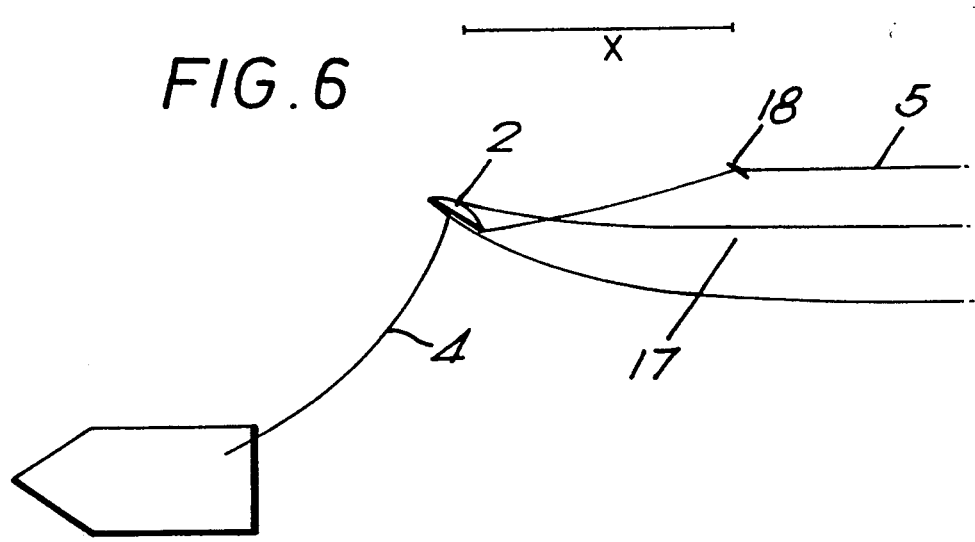
FIG. 6 is a schematic plan view illustrating the position of a deflector wing in the tow-line according to a further alternative embodiment of the invention.

FIG. 6 illustrates a further embodiment according to the invention by which a deflector wing 18 has been positioned in the tow-line 5 a distance x behind the deflector 2. As illustrated the tow-line 4 from the vessel is leading to the deflector 2, which has only been schematically illustrated and from the end of deflector 2 the tow-line 5 extends to the towed equipment. In the distance x, which may be approx. 50 meters a wing element 18 which is smaller than the deflector has been positioned vertically in the water. This wing element leads to displacement of the towed line 5 to a position outside the wake produced by the deflector.

In FIG. 7 a possible embodiment of such a "mini"-wing has been illustrated. A tow-line 5 is passes through a tube-like clamping element 19 and the wing consists of a vertical positioned main wing element 20 which has a form similar to the body of the deflector, as illustrated on the Section A—A of FIG. 7. At each end of the body 20 there are positioned a weight element as illustrated by 21 and a buoyancy element 22 which together keep the wing element in a vertical position.

Reference is made in the above only to preferred embodiments, and it should be clear that there will be many possible variations within the scope of the invention.

We claim:

1. A deflector for installing in a tow-line between a towing vessel moving in a path and a tow in water behind said vessel, said tow being at least one of a streamer, a cable having seismic sources thereon, and a seismic source array, said deflector being suspended from a float and positioned between a forward part of said tow-line connected to said towing vessel and a rear part of said tow-line connected to said tow, the deflector comprising:

a deflector body having a streamlined configuration with a longitudinal axis extending downwardly in use when suspended from said float, a first side substantially facing said path of said vessel, a second side opposite to said first side, a forward portion, a rearward portion, a forward edge, a rear edge, a center of lift, an upper section above said center of lift, and a lower section below said center of lift;

a tow-line connection on said tow-line forward part;

a tow-point between said first side of said deflector body and said path of said vessel at said forward portion of said deflector body and lower than said center of lift, said tow-point being a crow's foot comprising an upper element having a forward part connected to said tow-line connection and a rearward part connected to said upper section and forward portion of said deflector body, and a lower element having a forward part connected to said tow-line connection and a rearward part connected to said lower section and forward portion of said deflector body, said rearward parts of said upper and lower elements lying on a line extending parallel to said longitudinal axis of said deflector body, and said upper and lower elements having different lengths;

an adjustable lever pivotally connected by a first pivotal connection to said deflector body adjacent said rear edge thereof and extending rearwardly thereof;

a rear end on said adjustable lever displaced rearwardly of said rear edge of said deflector body;

an attachment point on said rear end of said adjustable lever for connecting said rear part of said tow-line to said adjustable lever; and means for adjusting said adjustable lever for adjusting the position of said attachment point with respect to said deflector body.

2. The deflector as claimed in claim 1 and further comprising:

a force transmission central element for said crow's foot having a forward part connected to said tow-line and a rearward part connected to said forward part of said deflector body at a position lying in a plane extending substantially perpendicular to said longitudinal axis of said deflector body and between said rearward parts of said upper and lower elements.

3. The deflector as claimed in claim 1 and further comprising:
  means for adjusting said tow-point with respect to said deflector body between said forward and rearward edges thereof.

4. The deflector as claimed in claim 2 and further comprising:
  means for adjusting said tow-point with respect to said deflector body between said forward and rearward edges thereof.

5. The deflector as claimed in claim 1 wherein:
  said tow-point lies in a plane extending substantially perpendicular to said longitudinal axis of said deflector body at a distance between 1% and 3% of the length of said deflector body below said center of lift and between 0 and one-third of the chord length in the direction of width of said deflector body from said front edge thereof.

6. The deflector as claimed in claim 4 wherein:
  said tow-point lies in a plane extending substantially perpendicular to said longitudinal axis of said deflector body at a distance between 1% and 3% of the length of said deflector body below said center of lift and between 0 and one-third of the chord length in the direction of width of said deflector body from said front edge thereof.

7. The deflector as claimed in claim 1 wherein said means for adjusting said adjustable lever comprises:
  a second pivotal connection on said adjustable lever; and
  an adjustable mechanism mounted on said deflector body and operatively connected to said second pivotal connection for adjusting said rear end of said adjustable lever by pivoting said second pivotal connection through substantially 60° about said first pivotal connection between said adjustable lever and said deflector body.

8. The deflector as claimed in claim 6 wherein said means for adjusting said adjustable lever comprises:
  a second pivotal connection on said adjustable lever; and
  an adjustable mechanism mounted on said deflector body and operatively connected to said second pivotal connection for adjusting said rear end of said adjustable lever by pivoting said second pivotal connection through substantially 60° about said first pivotal connection between said adjustable lever and said deflector body.

9. The deflector as claimed in claim 1 wherein:
  said tow-point and said attachment point lie on a common plane extending substantially perpendicular to said longitudinal axis of said deflector body.

10. The deflector as claimed in claim 8 wherein:
  said tow-point and said attachment point lie on a common plane extending substantially perpendicular to said longitudinal axis of said deflector body.

11. The deflector as claimed in claim 1 and further comprising:
  a seismic cable link between said forward and rearward parts of said tow-line and separate therefrom for bypassing said deflector.

12. The deflector as claimed in claim 1 wherein:
  said deflector body has a wing-shaped profile;
  said means for adjusting said adjustable lever comprises an adjusting mechanism mounted on said deflector body and operatively connected to said adjustable lever for pivoting said adjustable lever about said first pivotal connection; and
  power means are mounted in said deflector body and operatively connected to said adjusting mechanism for operating said adjusting mechanism.

13. The deflector as claimed in claim 1 wherein:
  said means for adjusting said adjustable lever comprises
    an adjusting mechanism mounted on said deflector body and pivotally connected to said adjustable lever so that operation of said mechanism adjusts said adjustable lever with respect to said deflector body.

14. The deflector as claimed in claim 13 wherein:
  said adjustable lever comprises a frame member having a triangular shape with one short side and two long sides, a first corner formed by said short side and one of said long sides on which said first pivotal connection between said adjustable lever and said deflector body is disposed, a second corner formed by said short side and the other of said long sides to which said adjusting mechanism is pivotally connected to said adjustable lever, and a third corner formed by said long sides on which said attachment point is disposed; and
  said adjusting mechanism comprises a fluid operated piston and cylinder means.

15. The method as claimed in claim 13 and further comprising:
  a remotely controlled drive device mounted in said deflector body and operatively connected to said adjusting mechanism for remotely controlling said adjusting mechanism.

16. The deflector as claimed in claim 14 and further comprising:
  a remotely controlled drive device mounted in said deflector body and operatively connected to said adjusting mechanism for remotely controlling said adjusting mechanism.

17. The deflector as claimed in claim 1 and further comprising:
  a deflector wing in said rear part of said tow-line rearwardly of said attachment point and positioned substantially vertically in the water for directing said tow-line out of the wake produced by said deflector in use.

18. The deflector as claimed in claim 17 wherein:
  said deflector wing is positioned substantially 50 meters rearwardly of said deflector body.

19. The deflector as claimed in claim 17 wherein:
  said deflector wing comprises a main body having substantially the same form as and being smaller than said deflector body;
  a lower end and an upper end on said main body of said wing;
  a weight element mounted on said lower end of said main body; and
  a buoyancy element mounted on said upper end of said main body.

* * * * *